(12) United States Patent
Yu et al.

(10) Patent No.: US 7,046,318 B2
(45) Date of Patent: May 16, 2006

(54) POLARIZED LIGHT SOURCE SYSTEM COMPRISING MESHING PRISM PLATES AND LIQUID CRYSTAL DISPLAY USING THE SAME

(75) Inventors: Tai-Cheng Yu, Tu-Chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 136 days.

(21) Appl. No.: 10/707,237

(22) Filed: Nov. 29, 2003

(65) Prior Publication Data

US 2004/0114065 A1 Jun. 17, 2004

(30) Foreign Application Priority Data

Nov. 29, 2002 (TW) .............................. 91134731 A

(51) Int. Cl.
 *G02F 1/1335* (2006.01)
 *F21V 7/04* (2006.01)
(52) U.S. Cl. .......................... 349/64; 349/62; 362/620; 362/607
(58) Field of Classification Search ................. 349/96, 349/105, 65, 64, 62; 359/487, 640; 362/19, 362/607, 620
See application file for complete search history.

(56) References Cited

U.S. PATENT DOCUMENTS

| | | | | |
|---|---|---|---|---|
| 4,148,563 A | * | 4/1979 | Herbert | 359/222 |
| 5,339,382 A | * | 8/1994 | Whitehead | 385/146 |
| 5,422,756 A | * | 6/1995 | Weber | 359/487 |
| 5,587,816 A | * | 12/1996 | Gunjima et al. | 349/62 |
| 5,712,694 A | * | 1/1998 | Taira et al. | 349/9 |
| 5,982,540 A | * | 11/1999 | Koike et al. | 359/487 |
| 6,118,503 A | * | 9/2000 | Oki et al. | 349/65 |
| 6,239,851 B1 | * | 5/2001 | Hatazawa et al. | 349/62 |
| 6,335,999 B1 | * | 1/2002 | Winston et al. | 385/146 |
| 6,354,709 B1 | * | 3/2002 | Campbell et al. | 362/627 |
| 6,437,921 B1 | * | 8/2002 | Whitehead | 359/640 |
| 6,631,031 B1 | * | 10/2003 | Lee et al. | 359/487 |
| 6,811,274 B1 | * | 11/2004 | Olczak | 362/606 |
| 2002/0080598 A1 | * | 6/2002 | Parker et al. | 362/31 |

FOREIGN PATENT DOCUMENTS

| | | | |
|---|---|---|---|
| JP | 11149002 A | * | 6/1999 |
| JP | 2000221324 A | * | 8/2000 |

* cited by examiner

*Primary Examiner*—Andrew Schechter
*Assistant Examiner*—W. Patty Chen
(74) *Attorney, Agent, or Firm*—Wei Te Chung

(57) ABSTRACT

A polarized light source system (20) includes a light guide plate (22), a light source (24), a lamp cover (25), a quarter wave plate (23), an upward prism plate (26) and a downward prism plate (28). The light guide plate defines an optical inputting surface and an optical outputting surface interconnecting therewith. The light source and the lamp cover are stationed next to the optical inputting surface. The upward prism plate stationed next to the optical outputting surface defines a plurality of upward micro-prisms (262) on a surface opposite thereto. The downward prism plate stationed next to the upward prism plate includes a brightness enhancing film (284), and a plurality of downward micro-prisms (282) on a surface facing the upward prism plate. The upward and downward micro-prisms engaged with each other. The quarter wave plate includes a reflective film on a backing surface.

13 Claims, 3 Drawing Sheets

POLARIZED LIGHT SOURCE SYSTEM COMPRISING MESHING PRISM PLATES AND LIQUID CRYSTAL DISPLAY USING THE SAME

BACKGROUND OF INVENTION

1. Field of the Invention

This invention concerns light source systems, and more specifically a polarized light source system with a pair of prism plates and a liquid crystal display (LCD) using the same.

2. Description of Related Art

Most users of portable devices such as laptop and notebook computers, mobile phones and game devices expect the viewing screens thereof to be large, clear and bright. Performance equal to that of cathode-ray tube (CRT) desktop monitors is desired. LCDs are one type of flat panel display (FPD) which can satisfy these expectations. However, because liquid crystals are not self-luminescent, LCDs need an illuminator which offers sufficient luminance (brightness) for a planar surface.

Referring to FIG. 4, a conventional LCD 10 comprises a backlight system 12, a thin film transistor (TFT) substrate 14, a color filter substrate 16, liquid molecules 18 between the substrates 14, 16, and a pair of polarizers 19, 19' having optical axes perpendicular to each other. The backlight system 12 includes a light guide plate 122, a light source 124, and a light source reflector 126. Light emitted from the light source 124 enters a side of the light guide plate 122 and emits uniformly from a top surface of the light guide plate 122.

The light emitted from the light source 124 consists of p-polarized and s-polarized lights. In operation, the light is transported by light guide plate 122 into the polarizer 19. The polarizer 19 allows only one kind of p-polarized light polarized along an optical axis thereof to pass therethrough. Generally, at least 50% of the light is lost at the polarizer 19. The p-polarized light passes through the iTT substrate 14, liquid molecules 18 and the color filter substrate 16 in turn, with the result that no more than 20% of the light emitted from the light source 124 is used. That is, the efficiency of use of the light source 124 is no more than 20%.

SUMMARY OF INVENTION

Accordingly, an object of the present invention is to provide a polarized light source system which efficiently utilizes the light energy of a light source.

Another object of the present invention is to provide a liquid crystal display using a polarized light source system which efficiently utilizes the light energy of a light source.

To achieve the above objects, a polarized light source system comprises a light guide plate, a light source, a lamp cover, a quarter wave plate, an upward prism plate and a downward prism plate. The light guide plate defines an optical inputting surface, and an optical outputting surface interconnecting therewith. The light source is stationed next to the optical inputting surface. The lamp cover couples optical beams from the light source entering the light guide plate. The upward prism plate stationed next to the optical outputting surface defines a plurality of upward micro-prisms on a surface opposite thereto. The downward prism plate stationed next to the upward prism plate comprises a brightness enhancing film and a plurality of downward micro-prisms on a surface facing the upward prism plate. The upward and downward micro-prisms are optically engaged with each other. The quarter wave plate comprises a reflective film on a backing surface thereof.

These and other features, aspects and advantages of the present invention will become more apparent from the following detailed description and claims, and from the accompanying drawings in which:

DETAILED DESCRIPTION

Figure 1:
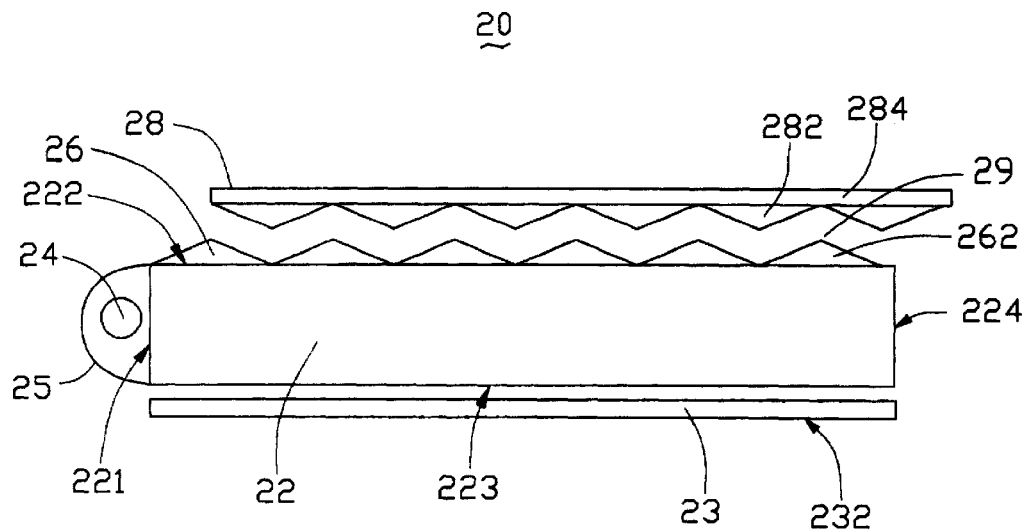
FIG. 1 is a schematic, cross-sectional view of a polarized light source system constructed in accordance with a preferred embodiment of the present invention.

For facilitating understanding, like components are designated by like reference numerals throughout the various embodiments of the invention as shown in the various drawing figures.

Reference will now be made to the drawing figures to describe the present invention in detail.

Referring to FIG. 1, a polarized light source system 20 of the present invention comprises a light guide plate 22 made of a transparent material, a light source 24, a lamp cover 25 having an inner surface coated with a reflective film, a quarter wave plate 23, an upward prism plate 26 and a downward prism plate 28. The quarter wave plate 23, the light guide plate 22, the upward prism plate 26, and downward prism plate 28 are stacked contiguously in that order from bottom to top. The light guide plate 22 defines an optical input surface 221 and an adjoining optical output surface 222. The light source 24 is stationed next to the optical input surface 221. The lamp cover 25 couples optical beams from the light source 24 entering into the light guide plate 22. The quarter wave plate 23 comprises a reflective film (not labeled) on a backing surface 232 thereof.

The light guide plate 22 is a substantially rectangular plane plate, and comprises the optical input surface 221 adjacent to the light source 24, the optical output surface 222, a bottom surface 223, and three side surfaces 224. A plurality of reflective dot-patterns (not shown) are formed on or applied to the bottom surface 223, to promote uniform emission of light from the optical output surface 222. Further, to improve optical efficiency, reflective sheets or films can be secured on the bottom surface 223 and the side surfaces 224.

The upward prism plate 26 defines a plurality of uniform upward micro-prisms 262 on a surface thereof opposite from the light guide plate 22. The downward prism plate 28 includes a brightness enhancing film 284, and a plurality of downward micro-prism 282 integral with the brightness enhancing film 284. The upward micro-prisms 262 substantially mesh with the downward micro-prism 282, but leaving a gap 29 therebetween. A length of each micro-prism 262, 282 is preferably between 450 micrometers and 550 micrometers, and a height thereof is preferably between 200 micrometers and 250 micrometers. However, when a size of the light guide plate 22 is changed, the heights and lengths of the micro-prisms 262, 282 may be changed accordingly.

Figure 2:
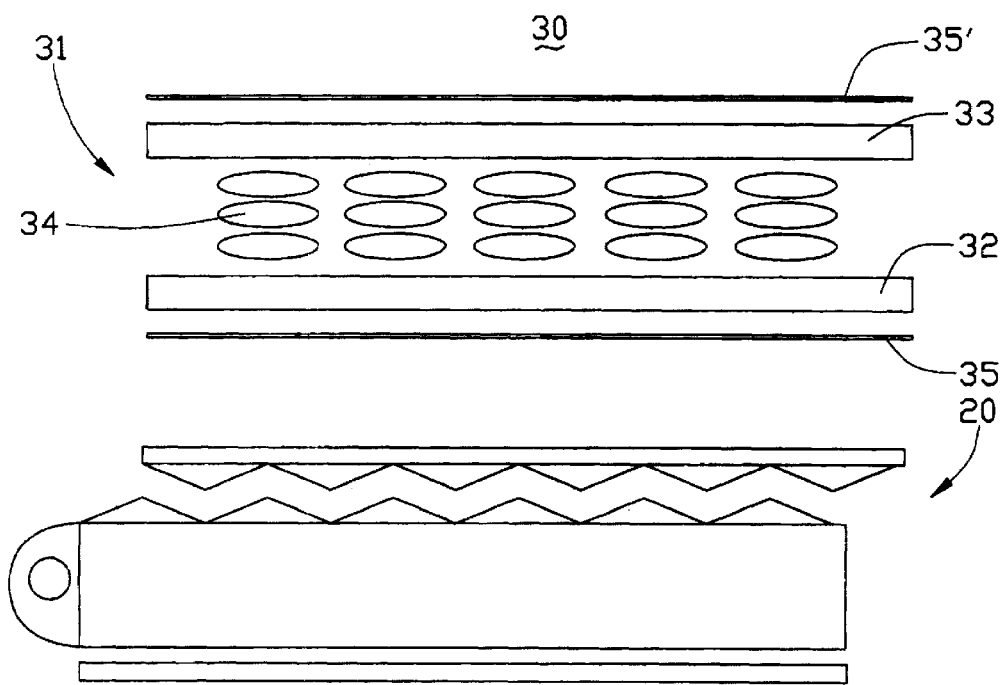
FIG. 2 is a schematic, cross-sectional view of a liquid crystal display constructed in accordance with a preferred embodiment of the present invention, which uses the polarized light source of FIG. 1.

Referring to FIG 2, a liquid crystal display 30 using the polarized light source 20 comprises a liquid crystal panel 31 stationed adjacent to the downward prism plate 28 of the light guide plate 20. The liquid crystal panel 31 comprises a TFT substrate 32, a color filter substrate 33, liquid crystal molecules 34 between the substrates 32, 33, and polarizers 35, 35' having optical axes perpendicular to each other, the polarizers 35, 35' being respectively attached on outer surfaces (not labeled) of the substrates 32, 33.

Figure 3:
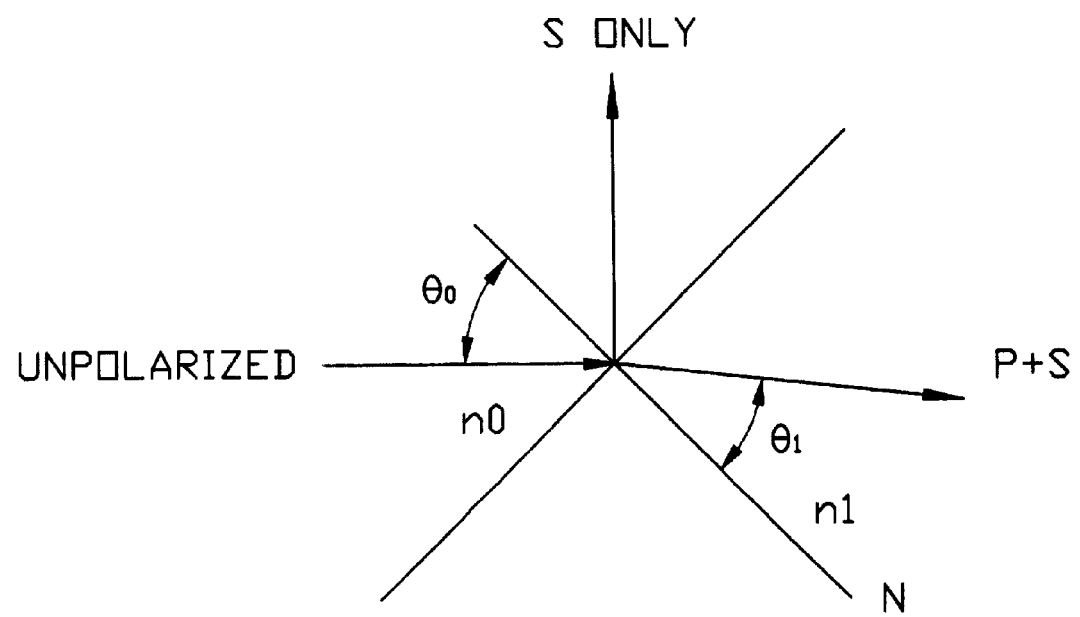
FIG. 3 is a light path diagram of light passing through a refractive medium into another refractive medium.
Figure 4:
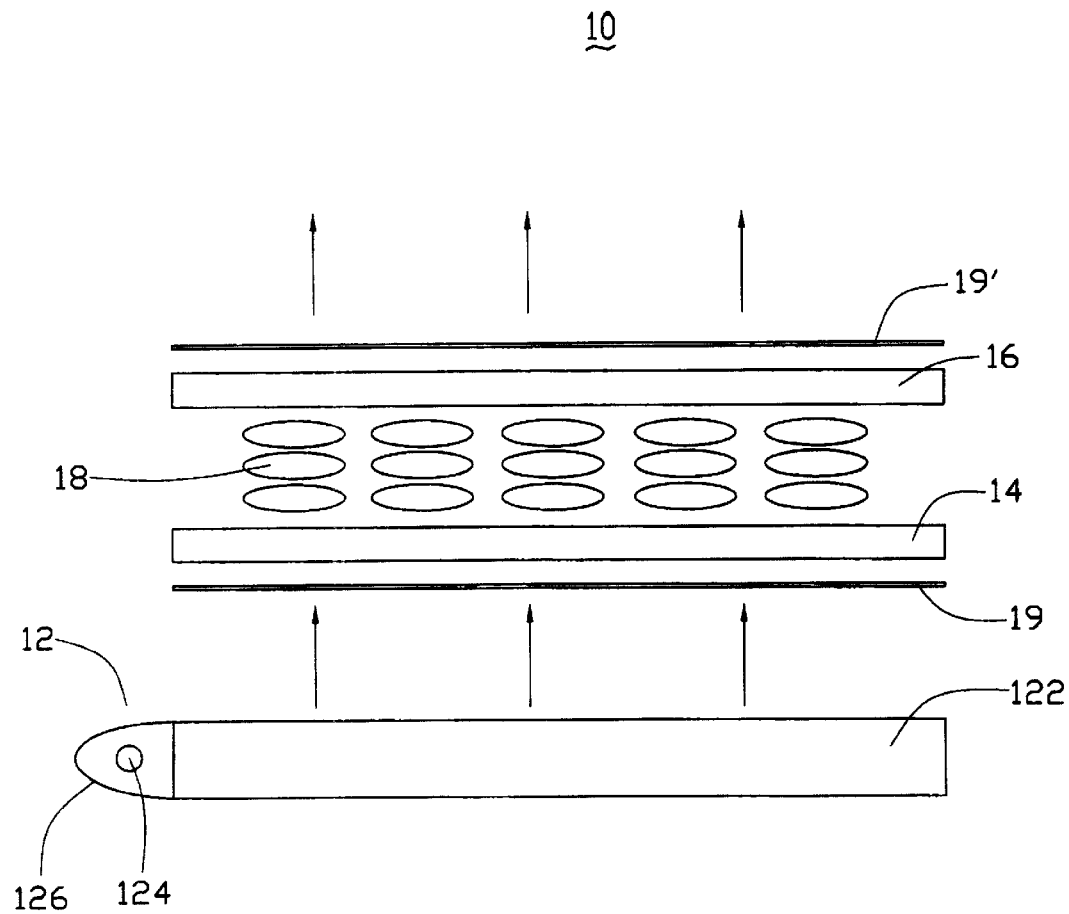
FIG. 4 is a schematic, cross-sectional view of a conventional LCD.

Referring to FIG 3, when light passes from a medium with refractive index $n_0$ into another medium with refractive index $n_1$, reflective and refractive phenomenon occur at the interface of the media. Supposing an incident angle $\theta_0$, a refractive angle $\theta_1$, a refractive index of an incident medium $n_0$, a refractive index of an emitting medium $n_1$, a p-polarized light energy rate of reflected light $R_p$, and an s-polarized light energy rate of reflected light $R_s$, then $R_p$, and $R_s$ can be described as follows:

$$R_p = \{n_1/\cos\theta_0 - n_0/\cos\theta_1\}^2 / \{n_1/\cos\theta_0 + n_0/\cos\theta_1\}^2$$

$$R_s = \{n_0/\cos\theta_0 - n_1/\cos\theta_1\}^2 / \{n_0/\cos\theta_0 + n_1/\cos\theta_1\}^2$$

As seen from these formulas, with an increase in the incident angle $\theta_0$, $R_s$ increases gradually. However, $R_p$ decreases to zero at a specific angle $\theta_B$ which is called Brewster's angle. $\theta_B$ can be expressed as follows:

$$\theta_B = \tan^{-1} n_0/n_1$$

When the incident angle of the light is at a Brewster's angle $\theta_B$, the reflected light is entirely s-polarized light, and the refractive tight will be combined with nearly 92% p-polarized light and 8% s-polarized light.

$$Rp = \{n1/\cos\theta0 - n0/\cos\theta1\}2 / \{n1/\cos\theta0 + n0/\cos\theta1\}2$$

$$Rs = \{n0/\cos\theta0 - n1/\cos\theta1\}2 / \{n0/\cos\theta0 + n1/\cos\theta1\}2$$

As seen from these formulas, with an increase in the incident angle θ0, Rs increases gradually. However, Rp decreases to zero at a specific angle θB which is called Brewster's angle. θB can be expressed as follows:

$$\theta B = \tan-1 n0/n1$$

When the incident angle of the light is at a Brewster's angle θB, the reflected light is entirely s-polarized light, and the refractive light will be combined with nearly 92% p-polarized light and 8% s-polarized light.

Referring to FIGS. 1, 2 and 3, in order to let light reach the upward micro-prisms 262 at a Brewster's angle, the apex angles of the upward and downward micro-prisms 262, 282 are not only matched with each other, but also configured in the range from 125° to 145°, preferably 135°. Further, a difference of the each of the refractive indices of the prism plates 26, 28 and the gap 29 is in the range from 0.001 to 0.2. In operation, light consisting of p-polarized and s-polarized light comes from the optical output surface 222 of the light guide plate 22 and reaches the upward micro-prisms 262 at a Brewster's angle. The reflected light is entirely s-polarized light, and the refractive light are combined with p-polarized light and s-polarized light. Then the combined refractive light reaches the downward micro-prism 282, further, s-polarized light is reflected, and p-polarized is refracted. After that interfaces, the combined refracted light is nearly pure p-polarized light. The reflected s-polarized light is converted to p-polarized light by the quarter wave plate 23 in the following way. The s-polarized light returns back through the light guide plate 22, enters the quarter wave plate 23, is reflected by the reflective film of the quarter wave plate 23, and passes back out from the quarter wave plate 23. Then the converted p-polarized light passes back through the light guide plate 22 and the prism plates 26, 28. The converted p-polarized light together with the aforementioned refracted p-polarized light illuminate the liquid crystal display 30. Therefore, almost all the light from the light source 24 is transmitted as p-polarized light out from the polarized light source system 20 and into the polarizer 35 of the liquid crystal panel 31. An efficiency of utilization of the light source 24 is greatly increased.

In an alternative embodiment, in the polarized light source 20, the gap 29 between the prism plates 26, 28 can be eliminated. A difference between the refractive indices of the prism plates 26, 28 is between 0.001 and 0.2. Therefore the polarized light source 20 still attains efficient utilization of the light source 24.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A polarized light source system comprising:
   a light guide plate made of transparent material, and including a light incident surface, a light emitting surface and a bottom surface;
   a light source positioned adjacent to the incident surface;
   a lamp cover coating with a reflective film on an inner surface thereof adjacent to the light source;
   a pair of prism plates with a plurality of micro-prisms substantially meshing with each other, apex angles of the micro-prisms being in the range from 125° to 145°; and
   a quarter wave plate coated with a reflective film opposite to the bottom surface of the light guide plate.

2. The polarized light source system as described in claim 1, wherein the apex angles of the micro-prisms are 135°.

3. The polarized light source system as described in claim 1, wherein a difference between refractive indices of the prism plates is in the range from 0.001 to 0.2.

4. The polarized light source system as described in claim 1, wherein a length of each of the micro-prisms is in the range from 450 micrometers to 550 micrometers, and a height of each of the micro-prisms is in the range from 200 micrometers to 250 micrometers.

5. The polarized light source system as described in claim 1, wherein the micro-prisms of the prism plates define a gap therebetween.

6. The polarized light source system as described in claim 5, wherein a difference between refractive indices of the each of the prism plates and the gap is in the range from 0.001 to 0.2.

7. A liquid crystal display comprising:
   a liquid crystal panel including a thin film transistor substrate, a color filter substrate, liquid molecules filled therebetween, and two polarizers respectively adjacent to the thin film transistor substrate and the color filter substrate, the polarizers having optical axes perpendicular to each other; and
   a polarized light source system, including a light guide plate made of transparent material and which includes a light incident surface, a light emitting surface and a bottom surface, a light source positioned adjacent to the incident surface, a lamp cover coated with reflective film on an inner surface thereof adjacent to the light source, a pair of prism plates having a plurality of micro-prisms substantially meshing with each other, the micro-prisms having apex angles in the range from 125° to 145°, and a quarter wave plate coated with a reflective film opposite to the bottom surface of the light guide plate.

8. The liquid crystal display as described in claim 7, wherein the apex angles of the micro-prisms are 135°.

9. The liquid crystal display as described in claim 7, wherein a difference between the refractive indices of the prism plates is in the range from 0.001 to 0.2.

10. The liquid crystal display as described in claim 7, wherein a length of each of the micro-prisms is in the range from 450 micrometers to 550 micrometers, and a height of each of the micro-prisms is in the range from 200 micrometers to 250 micrometers.

11. The liquid crystal display as described in claim 7, wherein the micro-prisms of the prism plates define a gap therebetween.

12. The liquid crystal display as described in claim 11, wherein a difference between refractive indices of each of the prism plates and the gap is in the range from 0.001 to 0.2.

13. A method of making a liquid crystal display, comprising steps of:
providing a light guide plate made of transparent material, said light guide plate defining a light incident surface, a light emitting surface and a bottom surface opposite to said light emitting surface;
positioning a non-polarized light source beside the light incident surface;
positioning a pair of prism plates at the light emitting surface with at least one of the prism plates being attached to the light emitting surface, the prism plates each comprising a plurality of micro-prism substantially meshing with the micro-prism of the other plate, apex of the micro-prism being in the range from 125° to 145°; and
positioning a quarter wave plate on the bottom surface with a reflective film opposite thereto.

* * * * *